May 13, 1941. P. A. RICHARD 2,241,521
AIRPLANE
Filed Oct. 15, 1938 2 Sheets-Sheet 2
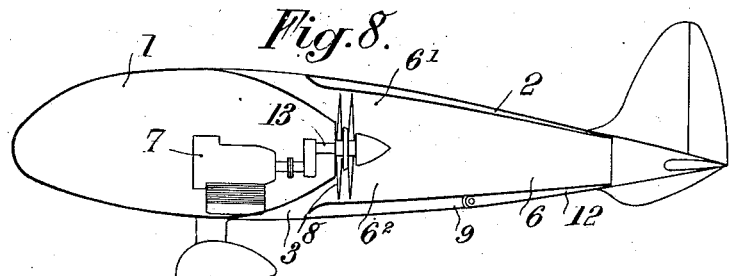
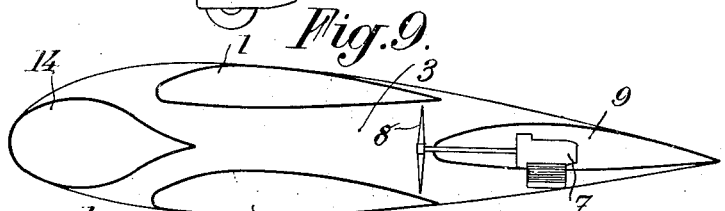
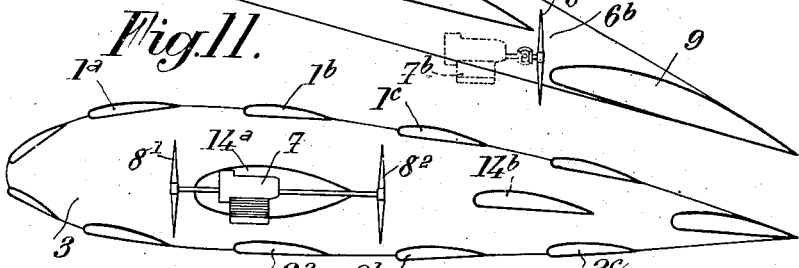
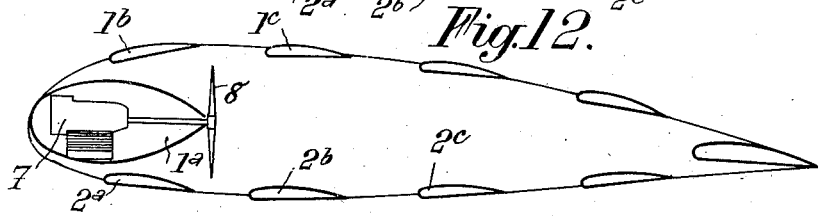
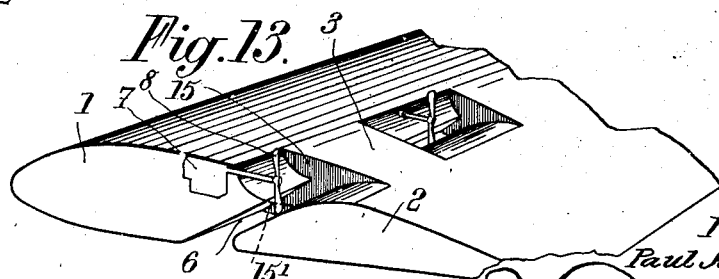
Inventor:
Paul Aimé Richard,
Bailey & Carson
Attorneys Patented May 13, 1941

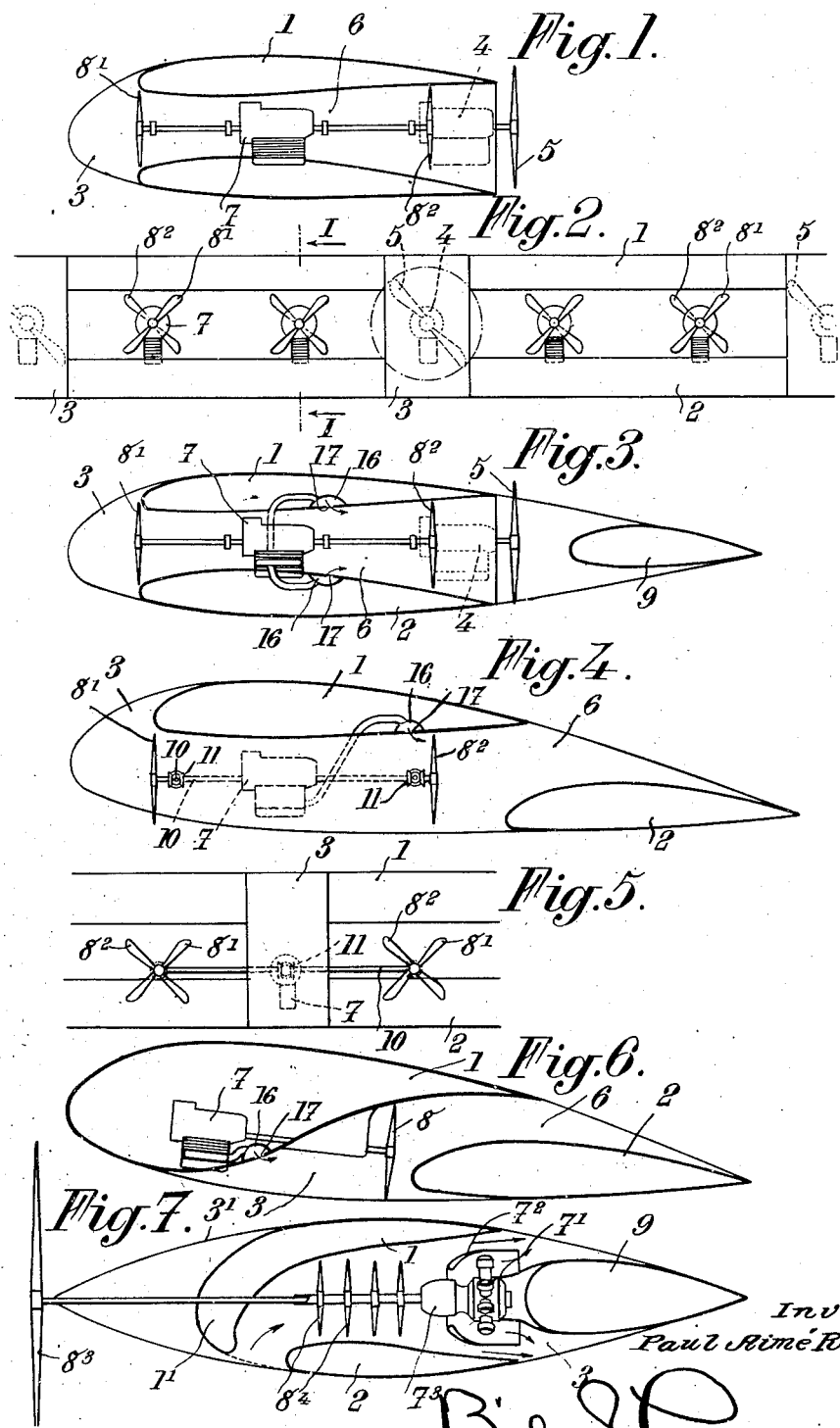

2,241,521

UNITED STATES PATENT OFFICE 2,241,521

AIRPLANE

Paul Aimé Richard, Clichy, France

Application October 15, 1938, Serial No. 235,269
In Luxemburg October 20, 1937

11 Claims. (Cl. 244—45)

The present invention relates to airplanes and similar flying machines.

The chief object of the present invention is to improve the structure, arrangement, and assembly of the wing elements and of the propelling elements of airplanes in such manner as to increase the total aerodynamic efficiency of the whole.

According to the essential feature of the present invention, the wing system of a machine of the type above referred to consists of a plurality of streamlined supporting surfaces, connected together preferably through bodies distributed transversely along the span of the flying machine, these supporting elements having an envelope of aerodynamic outline and being so located and positioned with respect to one another that they produce zones of flow of air in which the air streams undergo accelerating or regenerating impulses through the intermediary of at least one propelling airscrew arranged in said zones in such manner as to produce indraughts of air and thus to avoid tearing off of the air around said streamlined elements.

Other features of the present invention will result from the following detailed description of some specific embodiments thereof.

Preferred embodiments of the present invention will be hereinafter described, with reference to the accompanying drawings, given merely by way of examples, and in which:

Fig. 1 is a sectional view, on the line I—I of Fig. 2, of a portion of the wing system of an airplane made according to a first embodiment of the present invention;

Fig. 2 is a front elevational view corresponding to Fig. 1;

Fig. 3 is a transverse sectional view of a wing system for an airplane, made according to a modification of the arrangement of Figs. 1 and 2;

Fig. 4 is a longitudinal sectional view of a second embodiment of the system according to the invention;

Fig. 5 is a front elevational view of the structure of Fig. 4;

Fig. 6 is a fore-and-aft section of a wing system made according to a third embodiment of the invention;

Fig. 7 is a view, similar to Fig. 6, showing a modification of said third embodiment of the invention;

Fig. 8 is a fore-and-aft vertical section of a wing system made according to a fourth embodiment of the invention;

Fig. 9 is a view, similar to Fig. 8, showing a modification of said fourth embodiment of the invention;

Fig. 10 is a fore-and-aft section of wing system made according to a fifth embodiment of the invention;

Fig. 11 is a view, similar to Fig. 10, showing a modification of this fifth embodiment of the invention;

Fig. 12 is a view, similar to Fig. 10, showing another modification of this fifth embodiment of the invention;

Fig. 13 is a view showing, in perspective and in transverse section, a portion of a wing system made according to a sixth embodiment of the invention.

In the following description, I will explain how a wing system and propelling means for an airplane, seaplane or similar flying machine is made according to the present invention.

Up to this time, the propelling means (airscrews disposed either before or behind the wings) have generally been arranged, with respect to the supporting wing system, in a manner which is not very advantageous. This involves a reduction of efficiency resulting from the bad distribution of the pressures and suctions, existing around the propelling air-screw or air-screws, which are produced by the action of these propelling airscrews on the adjacent bodies.

According to the present invention, in order to obviate these drawbacks, I provide a supporting and propelling system the mechanical structure of which is relatively simple and further produces a satisfactory flow of air, in such manner that the lift is increased, that the efficiency of the air-screw or air-screws is improved and that the tearing off of air from the wing surfaces is avoided.

For this purpose, according to the present invention, the wing system is constituted by a plurality of streamlined elements interconnected by transverse bodies located at intervals from one another in such manner as to form between these elements zones of air flow, with delayed and accelerated currents so as thus to create indraughts of air and to prevent the tearing off of air from the adjacent surfaces of the wing elements. In order to obtain these results, at least some of the air-screw propellers (which are to be fitted on the aircraft for driving it when taking off and for obtaining the maximum flying speed under the best possible conditions of efficiency) are provided in the zones of flow in question, at places where the impulse they impart to the air stream can serve to regenerate the living force of the air stream, at least a portion of this force being destroyed by superficial frictions. In this way, premature tearing off of the air sheets is avoided and I obtain what has been called "lift increase" and what is in fact but the maintaining of the theoretical lift which, generally, is reduced by the slowing down of the air streams along the supporting surfaces.

In view of the particular structure of the wing system made according to the present invention, it is advantageous to provide in this wing system a relatively high number of these zones of flow between the constitutive elements connected together by the transverse bodies. In this way, it is possible to have recourse to a great number of engines, of low power, distributed in any suitable manner inside the wing system. Each of these engines then drives, either directly or through the medium of an individual shaft, one or several propellers, turning either all in the same direction or in different directions, which propellers are located in each of these zones of flow, for instance close to the upper side of a wing, where the living force of the air stream needs being regenerated.

I can also make use of an engine, belonging to a group of several engines, which would drive several intermediate shafts actuating respectively one or several propellers made as above explained.

In either of these cases, being given the small diameter of the circles corresponding to the rotation of these propellers, with respect to the dimensions of the whole, and the short distance between these respective propellers, the air streams obtained through their action can be considered as forming an air sheet which extends along the upper side of the wing profile. Besides, the latter may be slightly deformed so as to permit of locating and operating these propellers.

The appended drawings illustrate, by way of example, several embodiments of wing systems in which these principles and features, as above stated, have been applied.

In the example illustrated by Figs. 1 and 2, the wing system is constituted by two elements 1 and 2 of aerodynamic profile, arranged one above the other with an interval between them such that the upper side of the upper element 1 and the under side of the lower element 2 coincide substantially with the corresponding portions of a wing section of dimensions sufficient for enveloping the whole of these two elements. The transverse bodies 3 are made of a longitudinal section corresponding to this wing section, and, advantageously, they are distributed at regular intervals along the span of the wing structure. These transverse bodies serve to connect elements 1 and 2 together. With such an arrangement, I obtain a system the form of which is analogous to that of a so-called "ladder," or "Vierendeel" beam.

In each of these bodies 3, I may dispose one or several engines 4 which are adapted directly to drive a propeller 5 provided at the rear of body 3 so as to produce an indraught of air between the two wing elements. If necessary, these engines 4 may also drive auxiliary propellers located ahead of the transverse bodies and acting as auxiliary tractor propellers.

In each of the passages or tunnels 6 existing between wing elements 1 and 2 and two consecutive transverse bodies, I may also provide one or several engines 7, each of which drives a front propeller $8^1$ or a rear propeller $8^2$, or both of them. The front propeller is provided at the inlet of passage 6, for instance near the leading edges of elements 1 and 2 and the rear propeller is located at the outlet of said passage.

In Figs. 1 and 2, I have shown simple propellers, but I might also provide groups of two propellers turning in opposite directions, or several of these groups located behind one another.

In the embodiment illustrated by Fig. 3, I have provided a third wing element 9 for completing the wing section at the rear. This element 9 is given a shape and a location such that it is also inscribed in the outline of the longitudinal vertical section of the transverse bodies 3. It may contain a motor plant driving at least one propeller analogous to the above mentioned propellers 5, $8^1$ and $8^2$. With this mere difference, the wing structure is similar, in elevational view to that illustrated by Figs. 1 and 2.

Of course, in the embodiments according to Figs. 1 and 2 on the one hand, and according to Fig. 3, on the other hand, engines 4 and the external propellers 5 might be dispensed with. On the other hand, I might make use of engines analogous to those designated by reference numerals 4 and housed in the cowls constituted by the transverse bodies 3 for driving propellers such as $8^1$ and $8^2$, located in passages or tunnels 6, by means of intermediate shafts and of suitable transmissions.

In the embodiment illustrated by Figs. 4 and 5, the wing structure is constituted by wing elements 1 and 2, made as above explained, the lower element 2 being located at a distance toward the rear with respect to the upper element, that is to say in staggered relationship with respect thereto. The respective sections of these two wing elements have a suitable relative incidence with respect to each other.

In this embodiment of my invention, engines 7 are mounted in the transverse bodies 3 and drive propellers $8^1$ and $8^2$ through the medium of intermediary shafts 10 and of bevel gears 11, for instance.

In the embodiment of Fig. 6, I make use of an arrangement analogous to that just above described, in that the lower element 2 is located at the rear with respect to the upper element 1. But, in this case, the under side of this upper element is made of such a shape that it forms a passage leading from the middle part of the under side of the envelope wing section to the trailing part of the upper side of said wing section. With this arrangement, the thickness of element 1 may be sufficient for forming a cowl for the engine, or engines, 7 which serves (or serve) to drive propeller or propellers 8.

In the embodiment according to Fig. 7, I make use of three streamlined wing elements, 1, 2, and 9, analogous to those above described with reference to Fig. 3. According to this embodiment of the invention, the power plant includes at least one air engine $7^1$ supported ahead of the leading edge of the rear streamlined wing element 9, therefore at the outlet of the passage formed between wing elements 1 and 2. In this case, the engine is advantageously fitted with a cowl of the "N. A. C. A. $7^2$" type, and it is arranged to drive a system of propellers.

Although the system of propellers may be made as above explained, the power plant can also be used for driving at least one propeller $8^3$ supported, ahead of the wing structure, by an extension $3^1$ of one of the bodies 3. A suitable drive system $7^3$ permits, for instance, either of driving only this propeller at a given speed, or of driving it at a lower speed but while simultaneously driving at least one propeller $8^4$ located between wing elements 1 and 2.

Still in this embodiment of my invention, I have given streamlined element 1 a shape analogous to that of the preceding embodiment. But its under side is very concave, in such manner that this element 1 is provided with a kind of downward nose and that passage 6 opens, in the frontward direction, into the underside of the envelope wing section.

In the embodiment illustrated by Fig. 8, the front wing element 1 is given a shape and size such that it corresponds substantially to the whole of the front part of the envelope wing section, whereas elements 2 and 9 are constituted by wing sections of relatively small thickness, running respectively along the rear part of the upper side and of the under side of said envelope wing section. In this embodiment, the rear part 12 of the lower wing element 9 may be given the form of a pivoted flap adapted to occupy several angular positions. In this case, the front element 1 is of a size sufficient for containing the engines 7 which drive the propellers or groups of propellers 8. The rear part of element 1 is limited by two inclined walls terminating in a common edge parallel to the leading edge of said element 1, in such manner as to form two passages $6^1$ and $6^2$ starting respectively from the upper side and the under side of the envelope wing section and opening both into a common passage 6, limited by wing elements 2 and 9 and opening to the rear of the wing structure.

In the embodiment of Fig. 9, I make use, in addition to elements 1, 2, and 9 similar to those shown by Fig. 7, to a fourth wing element 14, the whole of these elements 1, 2, 9, and 14 being inscribed in a common envelope wing section. In this case, the engines 7 and the propellers 8 are carried, for instance, by the rear element 9. However, it should be well understood that these engines and propellers or at least some of them might also be mounted on the front element 14.

In the embodiment according to Fig. 10, the three elements 1, 2 and 9 are located at different levels and behind one another, but they are still inscribed in the envelope wing section of the transverse bodies 3. In this case, propellers $8^a$ and $8^b$ are located either wholly or partly in slots or passages $6^a$ and $6^b$ of streamlined section existing between the wing elements, and the engines $7^a$ and $7^b$ which respectively drive these propellers may be arranged in different manners:

They may be housed in elements 1 and 2 and in this case the propellers are directly driven by said engines, so that their axes may be at the level of the trailing edges and/or of the leading edges of elements 1 and 2. Or alternately, said propellers may be driven through vertical intermediate shafts, with suitable transmissions.

Or the engines are housed (as shown by the drawings) in the transverse bodies 3, the driving means including, in this case horizontal or inclined shafts 10 and gears 11.

As shown by Figs. 11 and 12, the number of streamlined wing elements can be considerably higher than four. In embodiments of this kind, some of these elements, such as $1^a$, $1^b$, etc., $2^a$, $2^b$, etc., are distributed, with suitable locations and incidences, along the envelope wing section 3 and other elements, such as $14^a$ and $14^b$ are housed inside said section. The propellers, in this arrangement, are driven by engines 7 housed either in one or several inner wing elements (as shown by Fig. 11) or in one or several outer elements (as shown by Fig. 12).

Fig. 13 permits of seeing the arrangement of the propellers or of some of the propellers 8 mounted on a wing made according to one of the embodiments of the invention, and especially when use is made of two wing elements 1 and 2 separated from each other by a passage 6, the air flowing through this passage being admitted through an aperture provided in the underside of the wing structure and discharged through an outlet of flaring shape provided in the upper side.

The propellers can then sweep a circle which is partly located inside the upper side of the envelope wing section, a recess 15 being of course provided for each of said propellers, in the upper side in question.

Thus, when a passage 6 is provided for the flow of air from the underside toward the upperside, the upper portion of the circle corresponding to the rotation of the propeller acts upon air flowing along the front part of the upperside, whereas the lower portion of this circle acts upon air that flows through said passage 6.

This Figure 13, additionally, shows the relative importance of the transverse bodies 3 which interconnect the wing elements and the manner in which the sections and the coverings of these bodies are faired to the streamlined wing elements 1 and 2.

It results from the drawings that the front part of recess 15 is angularly connected to the upperside of the envelope wing section, whereas its rear part is tangentially connected thereto.

Of course, instead of providing a distinct recess for each propeller, I might use a single recess for a plurality of propellers, forming a kind of longitudinal groove in the wing structure. In this case the respective axes of the propellers would be located as close as possible to one another, in such manner as to obtain a continuous sheet of air.

As a matter of fact, the same arrangement might be utilized with advantage, even in the absence of any channel 6, the bottom of the recesses being then constituted by a continuous surface, as shown in Fig. 13, by the dotted line $15^1$.

Whatever be the specific embodiment that is chosen, it will be advantageous to convey the exhaust gases of the engines into zones where their energy can be usefully employed, preferably in zones of overpressure located in the various passages limited by the respective streamlined wing elements.

For instance, as shown by Figs. 3, 4 and 6, said exhaust gases are fed to transverse conduits 16 provided with outlets 17.

In the preceding description, it has been assumed that the transverse bodies, which connect the wing elements together, are of relatively large size, since they serve, in certain cases to house the engines for which they act as cowlings. Of course, in this case, these bodies are necessarily hollow. But as the essential function of these bodies is to ensure the connection between the wing elements, these bodies can be constituted by mere rods or by transverse beams, either solid or of trussed structure, and the interval between these bodies can be increased to the maximum permitted by the conditions of strength and stability of the whole of the wing structure.

Besides, I might, according to the invention, make use of a single transverse body, located for instance at the middle of the span and which would support the wing elements in the same manner as the fuselage of a multiplane supports the respective wings.

Each engine can drive its propeller or its group of propellers either directly or through the intermediary of a speed multiplying gear, such as that shown at 13 in Fig. 8, which permits of utilizing propellers of smaller diameter working with a maximum efficiency. When each engine thus drives its propeller or a group of propellers rotating in opposite directions, these engines can have a relatively low power, in order that the diameter of each propeller should not exceed suitable dimensions. In the case of a powerful apparatus, the number of engines can thus be relatively high. In order to facilitate the starting of these engines, the engines may be mechanically coupled together, by groups of three, five, or even more, in such manner that the starting of these engines is simultaneous and that, one of the engines being started, the others are driven by it at a speed sufficient for starting them.

Another solution would consist in making use of one or several engines of high power, driving a main shaft which actuates secondary shafts adapted to drive the propellers or groups of inversed propellers.

Each engine or group of engines may be provided with a clutch permitting to separate it from the remainder when indications of the revolution counter shows that some cause opposes the starting of one of the engines.

Whatever be the particular embodiment that is chosen, an airplane made according to my invention meets all the requirements above set forth, especially concerning its general aerodynamic efficiency and the advantageous conditions in which the propellers are working, either on the ground or in flight.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An airplane comprising a plurality of sustaining members of air-foil action in vertical section one arranged above and in front of another, the front end of the aft member being at least substantially as far forward as the rear end of the front member, to form a generally horizontal passage therebetween, connecting members of air-foil section in vertical section connecting said sustaining members together, said sustaining members lying within the transverse projections of said connecting members, and a propeller mounted in substantially horizontal alignment with such passage to propel air through such passage, said propeller being vertically aligned with at least one of said sustaining members.

2. In a device as claimed in claim 1, said connecting members being of substantial transverse dimensions.

3. In a device as claimed in claim 1, a second propeller located outside of said passage.

4. In an airplane as claimed in claim 1, an engine for said propeller housed inside said connecting members.

5. In an airplane as claimed in claim 1, an engine for said propeller housed in one of said sustaining members.

6. In an airplane as claimed in claim 1, an engine for said propeller located in said passage.

7. An airplane as claimed in claim 1 comprising a third sustaining member located directly below said front member.

8. In an airplane as claimed in claim 1, a third sustaining member having its leading edge parallel with those of the first two members, and having its trailing edge coincident with the trailing edge of said connecting members.

9. In an airplane as claimed in claim 1, said sustaining members including a plurality of members having parallel leading edges, said members being distributed along the outline of the connecting members and being tangent to such outline, and at least one sustaining member located inside the outline of the said connecting members.

10. In an airplane as claimed in claim 1, said sustaining members including a plurality of members having parallel leading edges, said members being distributed along the outline of the connecting members and being tangent to such outline, at least one sustaining member located inside the outline of the said connecting members, and an engine for said propeller housed in said last sustaining member.

11. In an airplane as claimed in claim 1, a third sustaining member having its leading edge parallel with those of the first two members, and having its trailing edge coincident with the trailing edge of said connecting members, and an engine for said propeller mounted at the front of said third member.

PAUL AIMÉ RICHARD.